Garrett & Rauch,
Feather Renovator.
No. 113,157. Patented Mar. 28, 1871.
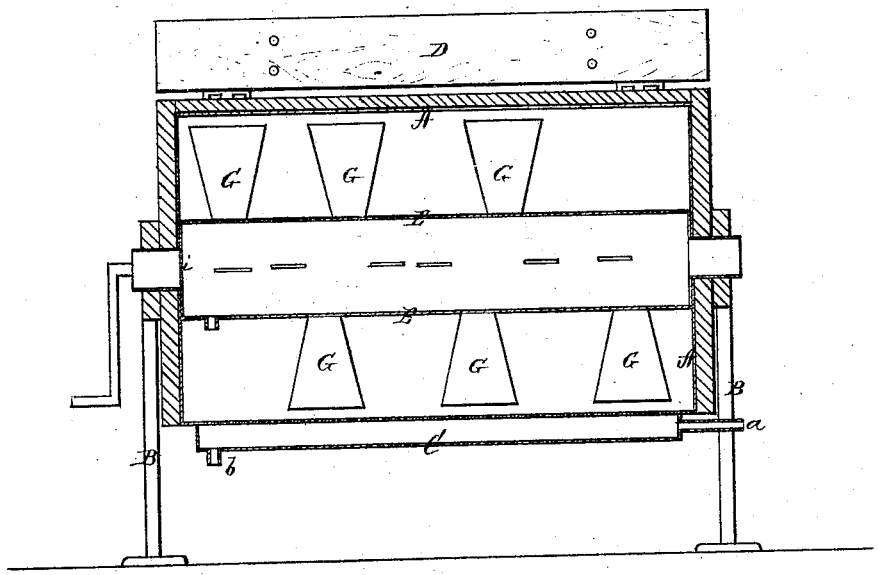
Witnesses.
C. L. Evert
R. W. Steele
Inventor.
Jonathan Garrett
Jonas E. Rauch
per
Alexander Mason
atty.

United States Patent Office.

JONATHAN GARRETT AND JONAS E. RAUCH, OF SELIN'S GROVE, PENNSYLVANIA.

Letters Patent No. 113,157, dated March 28, 1871.

IMPROVEMENT IN FEATHER-RENOVATORS.

The Schedule referred to in these Letters Patent and making part of the same.

*To all whom it may concern:*

Be it known that we, JONATHAN GARRETT and JONAS E. RAUCH, of Selin's Grove, in the county of Snyder and in the State of Pennsylvania, have invented certain new and useful Improvements in Feather-Renovator; and do hereby declare that the following is a full, clear, and exact description thereof, reference being had to the accompanying drawing and to the letters of reference marked thereon making a part of this specification.

The nature of our invention consists in the construction and arrangement of a "feather-renovator," as will be hereinafter more fully set forth.

In order to enable others skilled in the art to which our invention appertains to make and use the same, we will now proceed to describe its construction and operation, referring to the annexed drawing which is a longitudinal vertical section of our feather-renovator.

A represents a cylinder, which is to lie in a frame, B, or upright bearings, and is provided with a door, D, on top.

On the under side of the cylinder A is attached a trough, C, with a pipe, $a$, leading into it at one end, for the purpose of introducing steam into the frame.

This trough is also provided with an opening, $b$, in its bottom, to let the water run out that collects from the steam. The water will always run down into this trough, which is a great advantage.

In the bottom of the large cylinder are three rows of small holes, to let the steam come up through the feathers and for the water to run through into the trough. By this plan no water will stay in the cylinder with the feathers; it will always run down through the little holes into the trough.

Through the center of the cylinder A is placed a smaller cylinder, E, with fans G G, at suitable intervals, on its outside. This cylinder E is made air-tight except at the ends where the steam enters and escapes.

This middle cylinder is calculated to dry the feathers before they are taken out of the machine.

When the feathers are worked and made wet enough with steam from the trough below, then the steam will be turned off from below and run through the middle cylinder E, out of which the steam will escape through small holes at the end, as shown at $i$. This will make heat in the machine and dry the feathers. While this is in process the crank and cylinder will be worked rapidly, and the fans on the cylinder will make a current of air, and, in addition to the heat, will help dry the feathers.

In this manner a lot of feathers may be cleaned and dried in a very short time.

The small holes shown in the door D are for the purpose of letting more steam escape.

The machine may be made of tin, brass, copper, zinc, galvanized-iron, or any other suitable material.

Having thus fully described our invention,

What we claim as new, and desire to secure by Letters Patent, is—

The construction and arrangement of the outer cylinder A with perforated bottom, the lid D, trough C with inlet $a$ and outlet $b$, the inner cylinder E, and fans G G, all substantially as shown and described, and for the purposes herein set forth.

In testimony that we claim the foregoing we have hereunto set our hand this 16th day of January, 1871.

JONATHAN GARRETT.
JONAS E. RAUCH.

Witnesses:
J. S. BURKHART,
JACOB RAUCH.